US006929022B1

(12) United States Patent  
Ingalls et al.

(10) Patent No.: US 6,929,022 B1
(45) Date of Patent: Aug. 16, 2005

(54) FIRE HYDRANT VALVE SEAT FLANGE

(75) Inventors: Todd Ingalls, Ellsworth, MI (US);
Kevin J. Wright, Charlevoix, MI (US);
Bryan J. Griffin, Petoskey, MI (US);
Richard J. Brooks, East Jordan, MI (US)

(73) Assignee: East Jordan Iron Works, Inc., East Jordan, MI (US)

( * ) Notice: Subject to any disclaimer, the term of this patent is extended or adjusted under 35 U.S.C. 154(b) by 0 days.

(21) Appl. No.: 10/881,293

(22) Filed: Jun. 30, 2004

(51) Int. Cl.[7] .............................. E03B 9/04; F16K 1/42
(52) U.S. Cl. ...................................... 137/283; 251/367
(58) Field of Search .............................. 137/283, 272, 137/307, 294; 251/366, 367

(56) References Cited

U.S. PATENT DOCUMENTS

| 2,078,782 | A | * | 4/1937 | Storey ........................ 137/283 |
| 2,630,823 | A | * | 3/1953 | Mueller et al. ............. 137/283 |
| 3,980,096 | A | * | 9/1976 | Ellis et al. .................. 137/283 |
| 4,303,223 | A | * | 12/1981 | Whisenhunt et al. ....... 137/283 |
| 4,791,952 | A | * | 12/1988 | Laurel ........................ 137/272 |
| 6,561,214 | B2 | * | 5/2003 | Heil ........................... 137/307 |

OTHER PUBLICATIONS

M&H Valve internet page, AWWA Products, M&H AWWA C502 Fire Hydrants.
Kennedy Valve, The Kennedy Guardian, brochure.
Mueller Col., Mueller Super Centurion 250 Fire Hydrant, May, 1997 brochure.
American AVK Company, Dry Barrel Fire Hydrants, brochure.
CLOW Valve Comapny, Medallion Hydrant, brochure.
U.S. Pipe and Foundry Co., The U.S. Pipe Metropolitan 250, Model 94—Fire Hydrant, brochure.
American-Darling Valve and Waterous, American-Darling 5 1/4" B-84-B Fire Hydrants, Mar., 1992 brochure.
American Flow Control, Ductile Iron 250 P.S.I., Waterous 5 1/4" Pacer Fire Hydrant, Mar. 1998 brochure.

* cited by examiner

Primary Examiner—Kevin Lee
(74) Attorney, Agent, or Firm—Warner Norcross & Judd

(57) ABSTRACT

A fire hydrant having a valve seat flange with an integral liner. In one embodiment, the fire hydrant includes a valve seat flange disposed between a standpipe and a hydrant shoe. The valve seat flange includes a standpipe neck defining internal threads to directly connect to the standpipe and a base flange to directly connect to the hydrant shoe. The liner includes an outer peripheral edge that is entrapped within the valve seat flange and an inner circumferential surface defining threads for receiving the valve seat of a valve assembly. The present invention also discloses a process of manufacturing a valve seat flange, including the steps of: (a) manufacturing the liner, (b) incorporating the liner into a core with the outer peripheral region of the liner exposed, (c) placing the integral core/liner into the valve seat flange mold and (d) forming the valve seat flange around the liner with the valve seat flange entrapping the outer peripheral region of the liner.

11 Claims, 6 Drawing Sheets

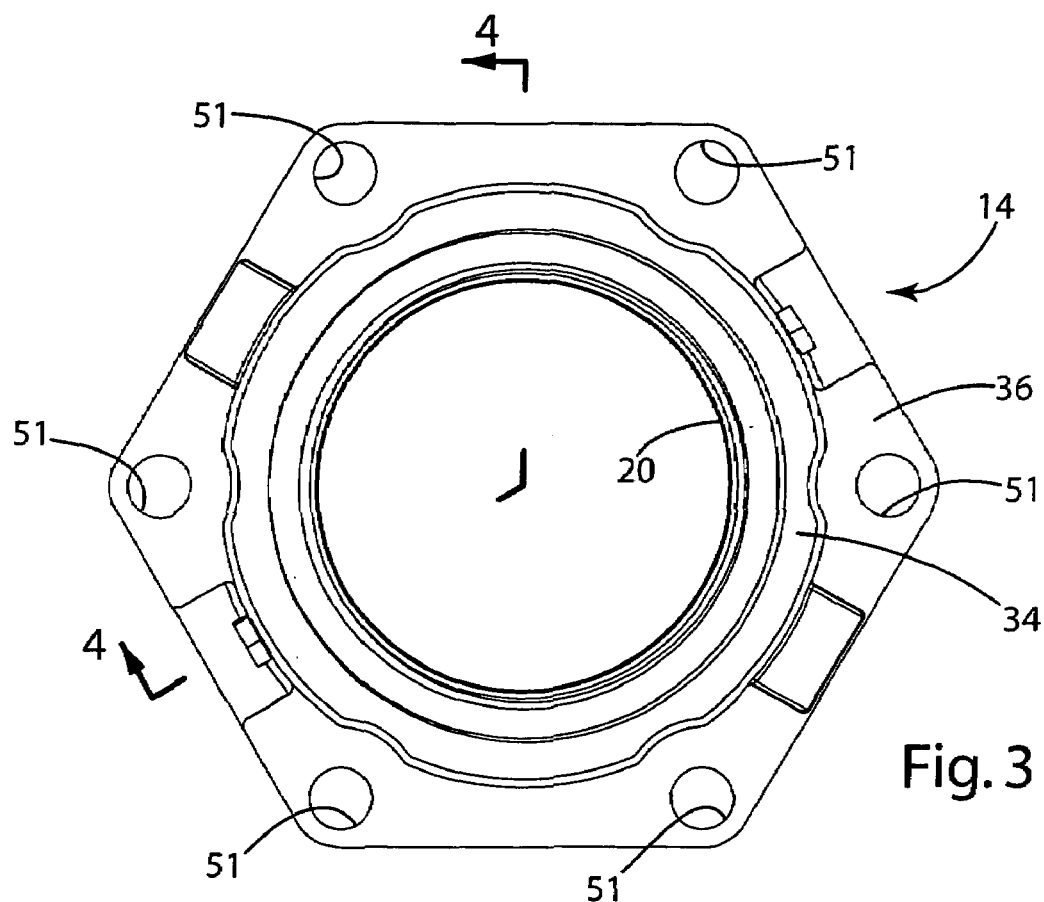
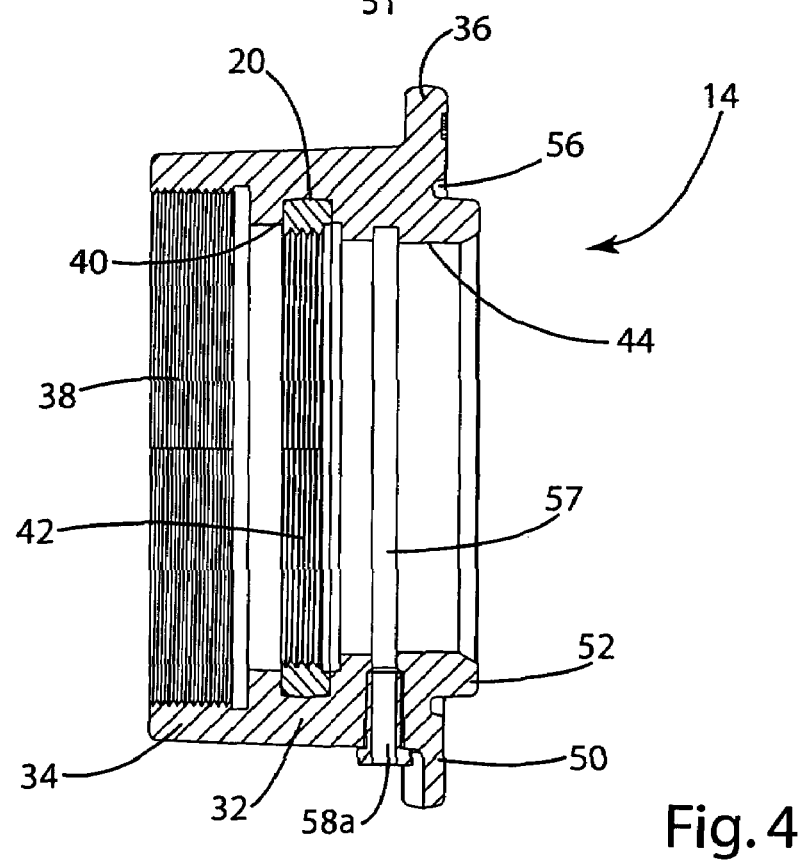
Fig. 3
Fig. 4

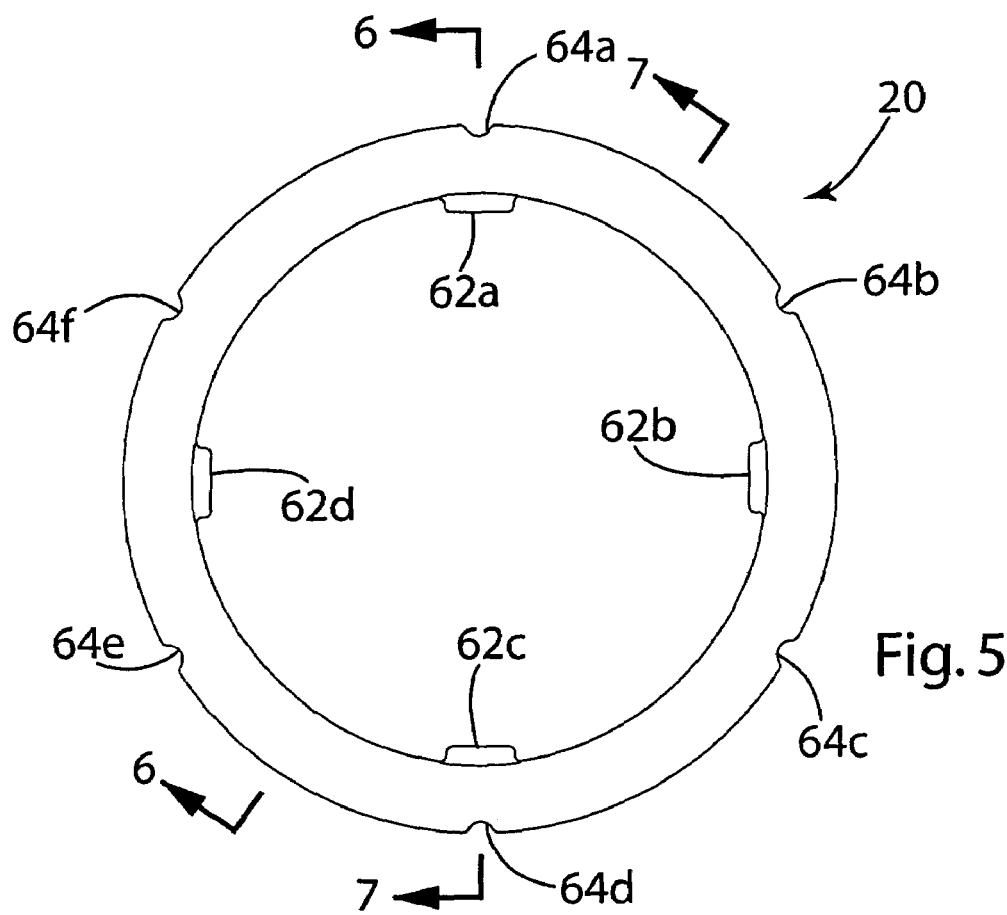
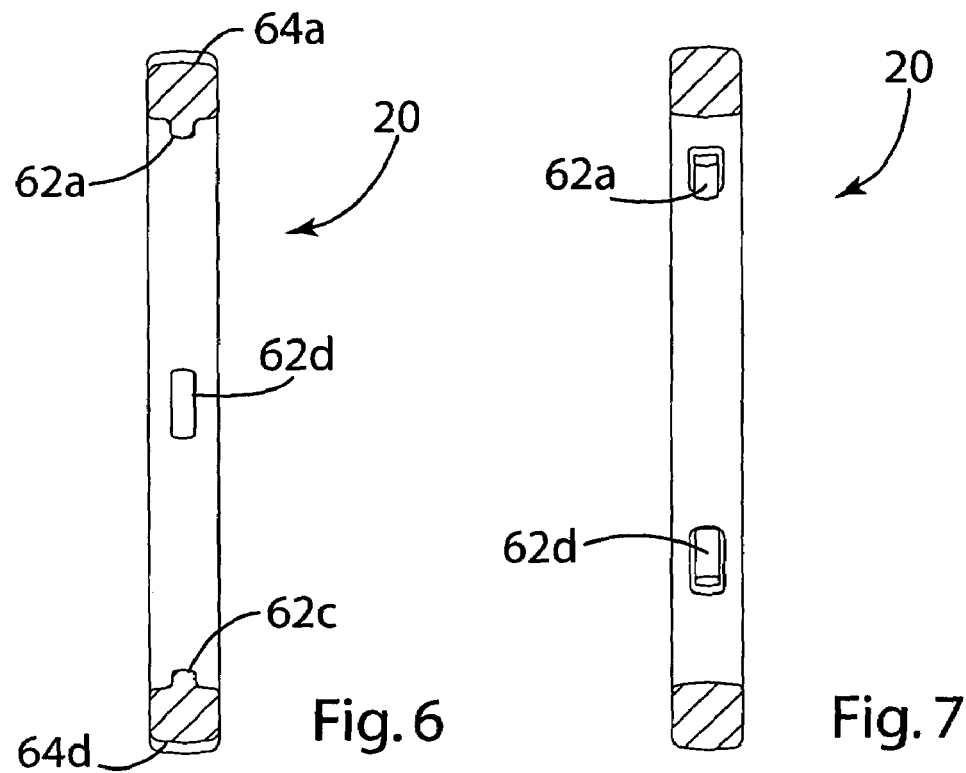

FIRE HYDRANT VALVE SEAT FLANGE

BACKGROUND OF THE INVENTION

The present invention relates to fire hydrants and more particularly to a fire hydrant with a unique valve seat flange and a method for manufacturing the same.

Fire hydrants are commonplace in our society providing a ready source of water to, among other things, help confront fire hazards. Fire hydrants typically remain idle for long periods of time. As a result, the internal workings of the hydrant must be able to withstand long periods of time in the presence of water without corroding or otherwise becoming nonfunctional.

With conventional fire hydrants, the flow of water through the hydrant is controlled by a valve. The valve is typically located below ground level within the hydrant shoe. A conventional valve includes a valve seat that is threaded in place within or adjacent to the hydrant shoe. The threaded seat permits the valve to be removed when maintenance is required. For example, the valve can be removed to permit replacement of the valve seal or to permit installation of a new valve. To ease removal of the valve, the valve seat is typically threadedly seated within a brass (or bronze) liner. The brass liner provides brass threads that resist corrosion and facilitate removal of the valve even after extended periods of time. Often, the valve seat is also brass so that the threaded interface between the valve seat and the brass liner includes intermeshing brass threads.

In many conventional constructions, the brass liner is sandwiched in one way or another between a flange at the lower end of the standpipe and the hydrant shoe. The typically sandwiched construction provides a number of part interfaces that provide numerous potential leakage paths. Further, the sandwiched construction may not provide the strength desired in some applications. Additionally, the separate brass liner increases parts inventory and complicates the assembly process.

SUMMARY OF THE INVENTION

The aforementioned problems are overcome by the present invention wherein a fire hydrant is provided with a valve seat flange having an integral liner. In one embodiment, the valve seat flange is disposed between the standpipe and the hydrant shoe, and includes a threaded brass liner that is insert cast as an integral part of the valve seat flange.

In one embodiment, the valve seat flange includes an internally threaded standpipe neck for threadedly mounting the valve seat flange to the lower end of the standpipe and planar base for connecting to the hydrant shoe. The liner may include a contoured outer peripheral region that interlocks with the valve seat flange to reduce the likelihood of rotation of the liner with respect to the valve seat flange.

The valve seat flanges may be manufactured in a process including the steps of: (a) manufacturing the liner, (b) incorporating the liner into a core with the outer peripheral region of the liner exposed, (c) placing the integral core/liner into the valve seat flange mold, (d) forming the valve seat flange around the liner with the valve seat flange entrapping the outer peripheral region of the liner.

The present invention provides a hydrant with a simple and effective valve seat that provides the assembly with increased strength and also reduces the number of potential leak paths. Additionally, the integral liner eliminates the need for handling and assembly of a separate liner. The integral liner is also entrapped within the valve seat flange, thereby reducing the potential for axial movement of the liner with respect to the flange.

These and other objects, advantages, and features of the invention will be readily understood and appreciated by reference to the detailed description of the preferred embodiment and the drawings.

BRIEF DESCRIPTION OF THE DRAWINGS

FIG. 3 is a top plan view of the valve seat flange.

FIG. 4 is a cross sectional view of the valve seat flange taken along line IV—IV of FIG. 3.

FIG. 5 is a top plan view of the valve seat liner.

FIG. 6 is a cross sectional view of the valve seat liner taken along line VI—VI of FIG. 5.

FIG. 7 is a cross sectional view of the valve seat liner taken along line VII—VII of FIG. 5.

DETAILED DESCRIPTION OF THE PREFERRED EMBODIMENT

Figure 1:
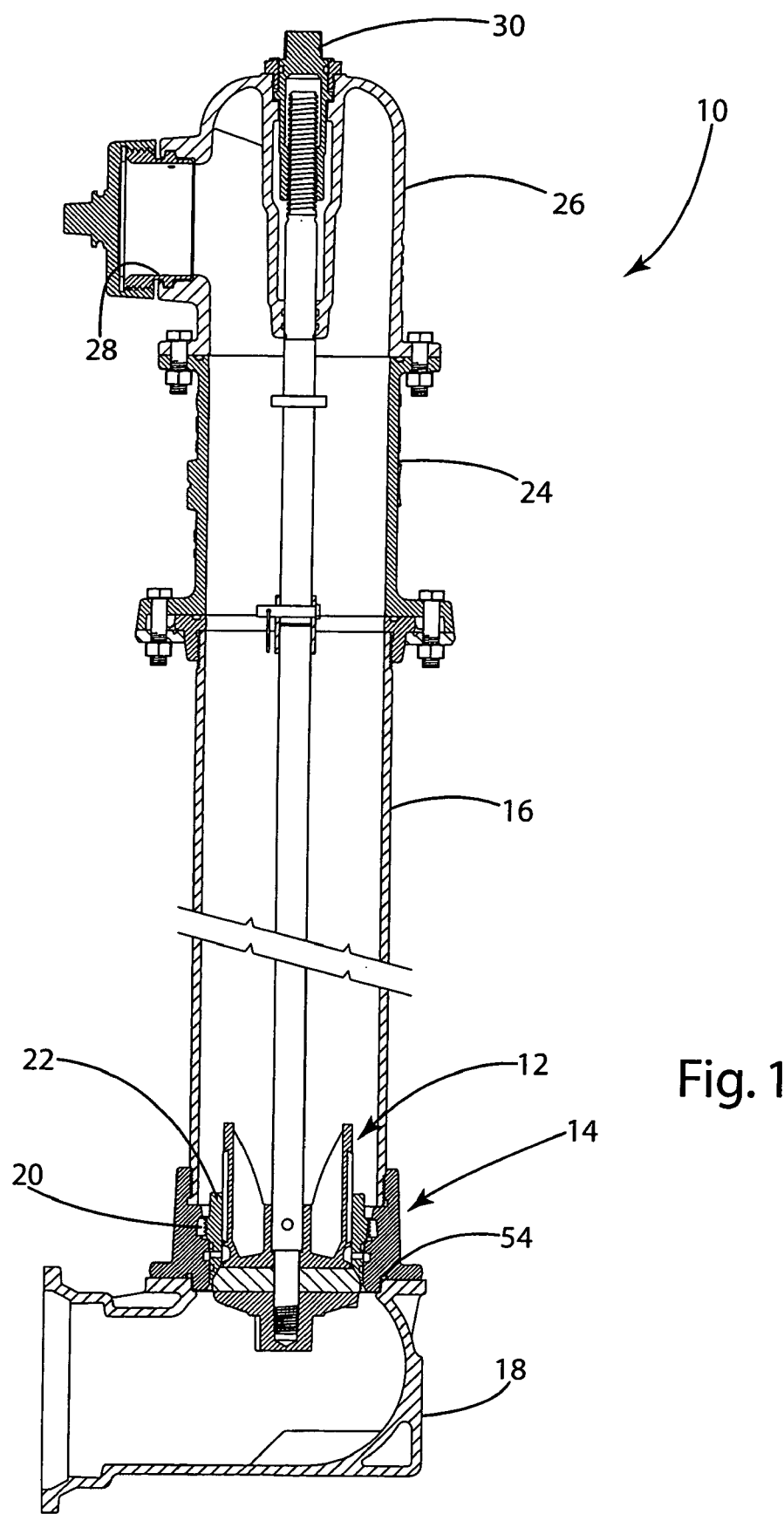
FIG. 1 is a cross-sectional view of a fire hydrant incorporating a valve seat flange in accordance with an embodiment of the present invention.

A fire hydrant incorporating a preferred embodiment of the present invention is shown in FIG. 1 and generally designated 10. The fire hydrant 10 includes a valve 12 mounted within a valve seat flange 14. The valve seat flange 14 is disposed between the standpipe 16 and the hydrant shoe 18, and includes an integral liner 20 for threadedly receiving the valve assembly 22. The integral liner 20 provides an integrated corrosion resistant liner for use in seating the valve assembly 22. The valve assembly 22 is threaded into the liner 20.

Fire hydrants are well known and accordingly will only be described herein to the extent helpful in disclosing the present invention. For purposes of disclosure, the present invention is described in connection with a conventional WaterMaster® fire hydrant available from East Jordan Iron Works of East Jordan, Mich. The present invention is, however, readily incorporated into a wide variety of other fire hydrants, and the present invention should be interpreted as being limited to any particular fire hydrant construction. In summary, the fire hydrant 10 of the illustrated embodiment includes a hydrant shoe 18 which functions as an inlet, a valve seat flange 14 to receive the valve assembly 22, a lower standpipe 16, an upper standpipe 24 and a top bonnet 26 that supports, among other things, the nozzle 28 and valve operating nut 30.

Figure 2:
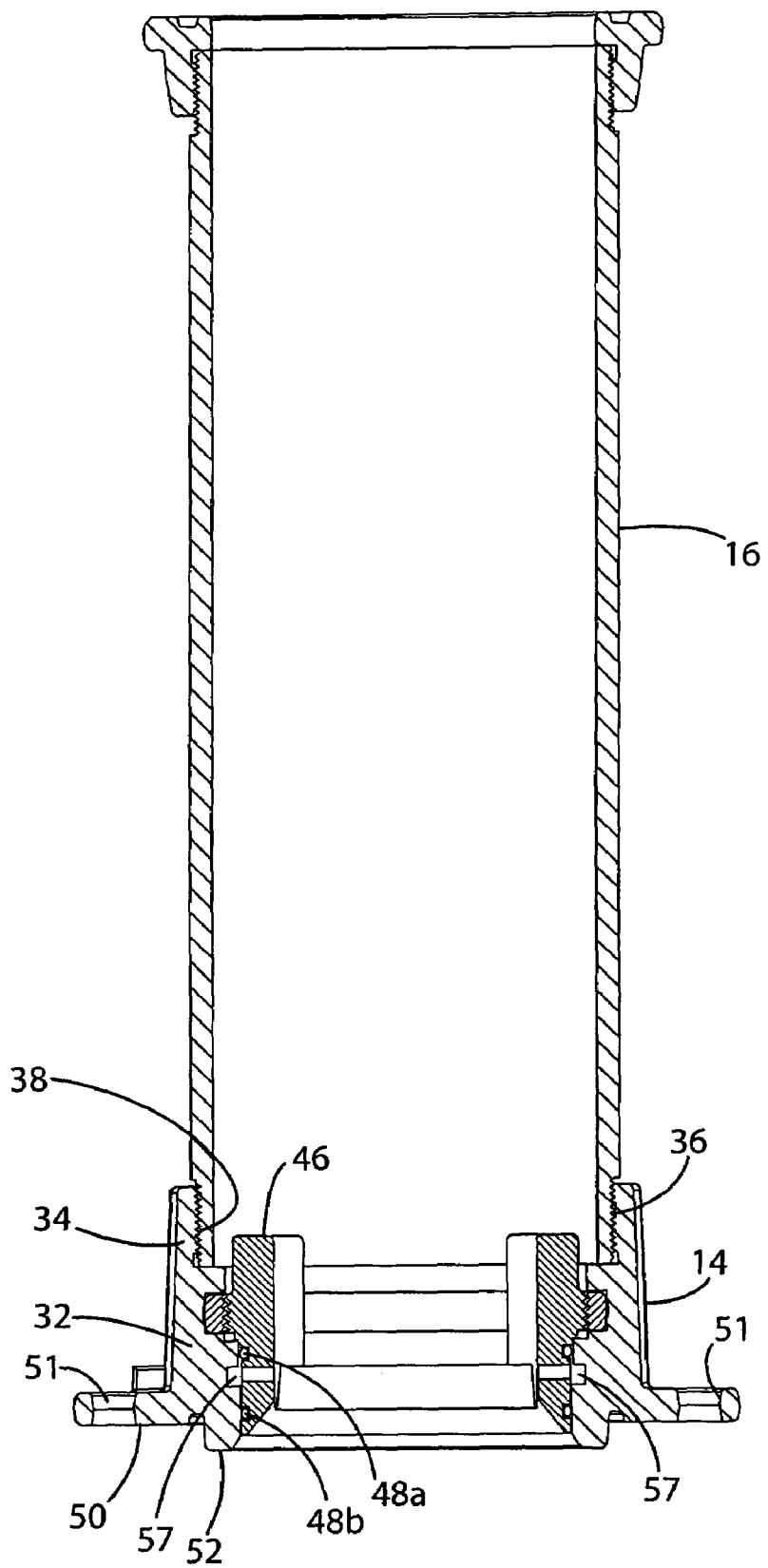
FIG. 2 is a cross sectional view of the lower standpipe with the valve seat flange.

As discussed above, the valve seat flange 14 is interposed between the lower standpipe 16 and the hydrant shoe 18 to operatively receive the valve assembly 22. The valve seat flange 14 includes a somewhat tubular body 32 having a standpipe neck 34 at its upper end and a base flange 36 at its lower end. Referring now to FIG. 2, the standpipe neck 34 is interconnected with the lower standpipe 16. In the illustrated embodiment, the lower standpipe 16 is threadedly connected with the valve seat flange 14. More specifically, in this embodiment, the lower standpipe 16 includes external threads 36 that are interfitted with internal threads 38 defined in the standpipe neck 34. The base flange 36 generally includes a planar peripheral flange 50 surrounding an annular rim 52. The peripheral flange 50 is generally planar providing a flat surface for mounting to the upper mounting surface of the hydrant shoe 18. The peripheral flange 50 defines a plurality of bolt holes 51 for intersecuring the valve seat flange 14 and hydrant shoe 18. The rim 52 is closely fitted within the hydrant shoe 18 to center the valve seat flange 14 and strengthen the connection between the valve seat flange 14 and the hydrant shoe 18. A lower o-ring 54 is preferably fitted to the base flange 36 within and an o-ring seat 56 to facilitate a leaktight seal between the valve seat flange 14 and the hydrant shoe 18. The valve seat flange 14 includes a first reduced diameter portion 40, which entraps the integral liner 20. The upper end of the first reduced diameter portion 40 defines a surface to function as a stop for the threaded lower standpipe 16. As described in more detail below, the valve seat flange 14 is preferably formed about the liner 20 so that the two elements are integral with one another. The liner 20 is generally ring-shaped defining internal threads 42. The liner 20 and its internal threads 42 are dimensioned to threadedly receive the valve assembly 22. The liner 20 is preferably manufactured from bronze, but may be manufactured from other materials having sufficient strength and corrosion resistance. For example, the liner may be brass in some applications. In this embodiment, the liner 20 is manufactured in rough form for casting and is machined after incorporation into the valve seat flange 14. The rough liner 20 is shown in FIGS. 5–7. The rough liner 20 of this embodiment includes a plurality of internal lugs 62a–d that interlock with the core 100 to reduce the possibility of the liner 20 rotating within the core 100. The lugs 62a–d protrude from the inner circumferential surface of the liner 20. As described in more detail below, the inner circumferential surface is ultimately machined to provide threads for interfacing with the valve assembly 22. This machining process removes the lugs 62a–d. The rough liner 20 may also define a plurality of grooves 64a–f on the outer circumferential surface of the liner 20. The grooves 64a–f interlock with the valve seat flange 14 when valve seat flange 14 is formed about the liner 20. This reduces the possibility of the liner 20 rotating within the valve seat flange 14. The grooves 64a–f may be replaced by notches, protrusions or other variations in shape that provide an interlock between the liner 20 and the valve seat flange 14. The valve seat flange 14 includes a second reduced diameter portion 44. The second reduced diameter portion 44 is dimensioned to closely receive the valve seat 46 of the valve assembly 22. The interior surface of the second reduced diameter portion 44 is preferably machined to provide a smooth, clean surface to interface with the o-rings 48a–b of the valve seat 46. The valve seat flange 14 also defines an annular drain recess 57 and a pair of drain holes 58a–b that permit water to drain from the standpipes 16, 24 and bonnet 26 when the valve assembly 22 is in the closed position. The drain mechanism is generally conventional and therefore will not be described in detail. Suffice is to said, however, that the drain recess 57 and drain holes 58a–b in the illustrated embodiment are defined in the second reduced diameter portion 44 so that they are disposed between the valve seat o-rings 60a–b.

Figure 8:
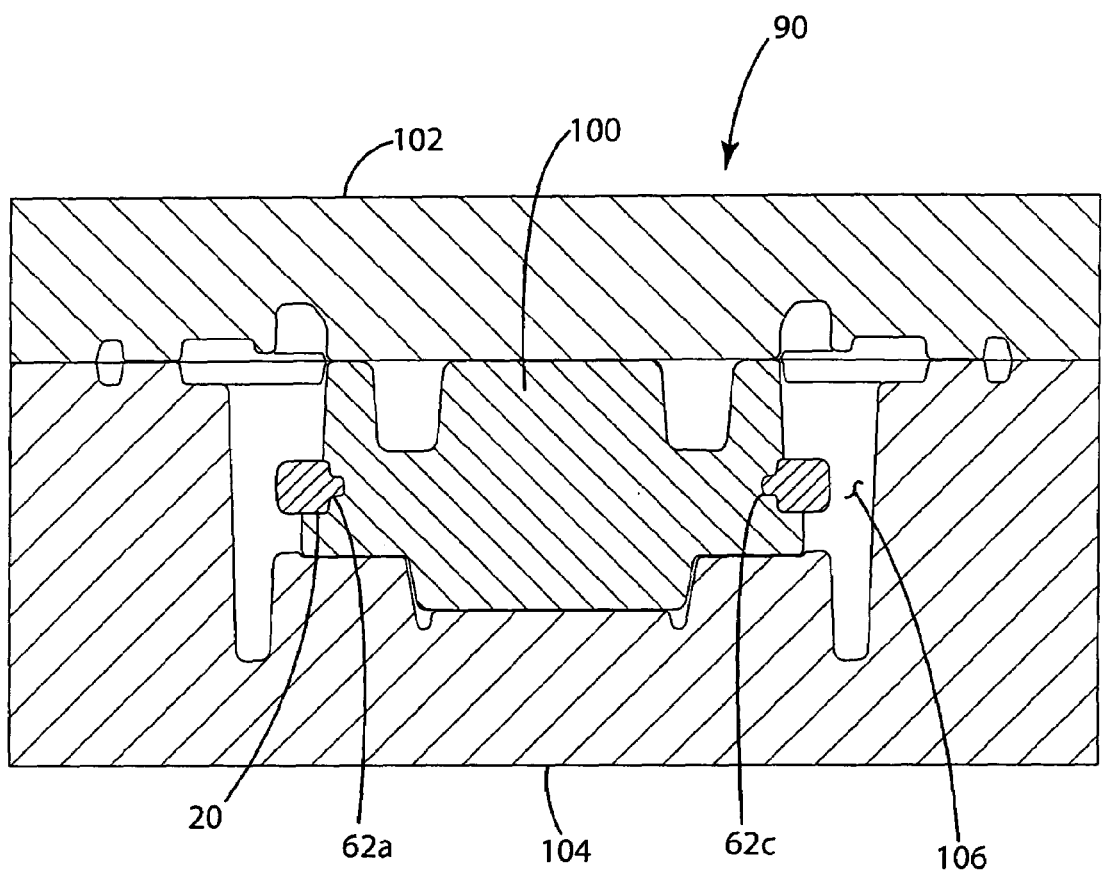
FIG. 8 is a cross sectional view of casting apparatus for use in manufacture of one embodiment of the present invention.
Figure 9:
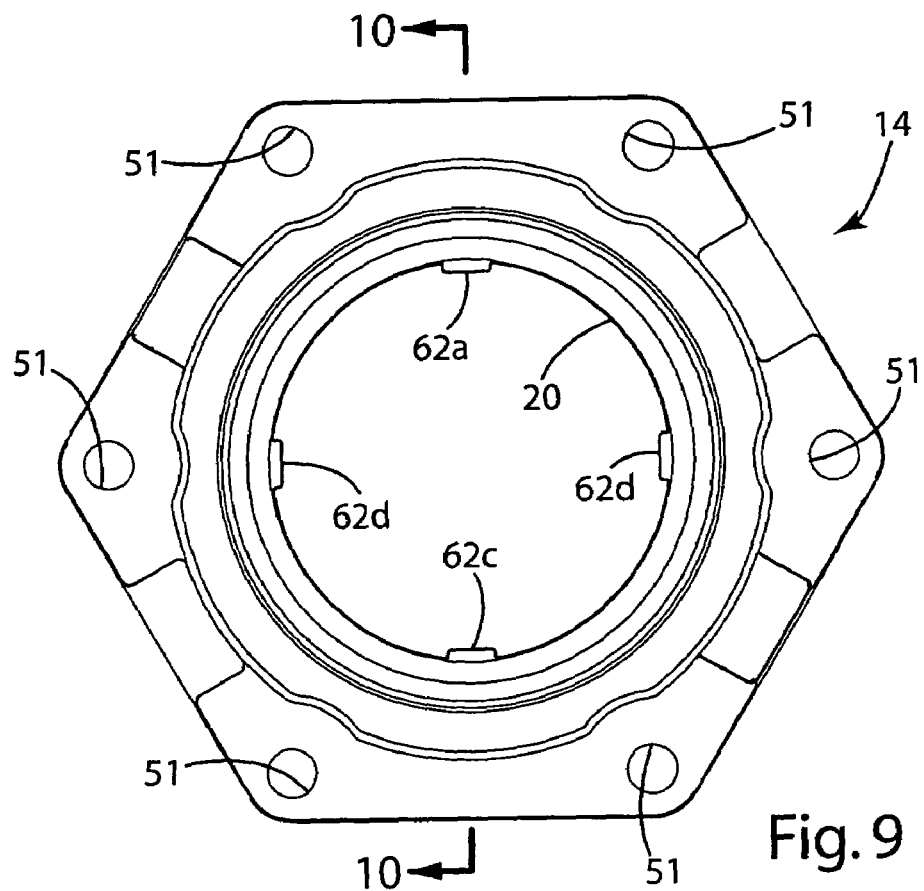
FIG. 9 is a top plan view of the rough valve seat flange after casting and before machining.
Figure 10:
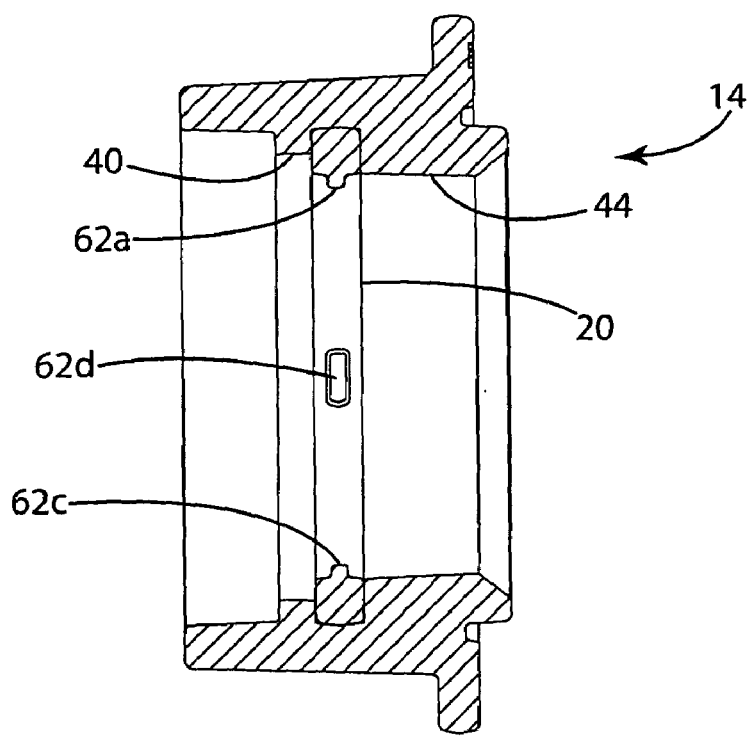
FIG. 10 is a cross sectional view of the rough valve seat flange taken along line X—X of FIG. 9.

A preferred method for manufacturing the valve seat flange 14 using a casting process will now be described with reference to FIGS. 8–10. The rough liner 20 is manufactured separately from the remainder of the valve seat flange 14 (See FIGS. 5–7). The liner 20 is preferably cast from bronze or brass using conventional casting tools and methods, but may be machined or otherwise formed. The liner 20 is not necessarily manufactured from bronze or brass and may be manufactured from other materials having sufficient strength and corrosion resistance.

The liner 20 is insert cast into valve seat flange 14 using a conventional casting core, for example, sand core 100. The core 100 maintains the liner 20 in the correct position during the process of casting the valve seat flange 14. The rough liner 20 is integrated into the core 100 using conventional core manufacturing techniques and apparatus. As shown in FIG. 8, the rough liner 20 is integrated into core 100 with its outer peripheral region exposed, and more specifically, that portion of the outer periphery of the liner 20 that is to be entrapped within the valve seat flange 14.

The valve seat flange 14 is cast, for example, from a ductile iron. In this embodiment, the valve seat flange 14 is cast using a conventional sand casting apparatus 90. In summary, a pattern (not shown) of the valve seat flange 14 is preformed. The pattern is shaped to occupy the space of the valve seat flange 14 and the core 100. The pattern is pressed into the cope 102 and drag 104 to define opposed portions of the casting cavity 106. A runner gate system (not shown) is also defined in the cope 102 to permit the desired molten material to be poured into the cavity 106. Before closing the cope 102, the core 100 is placed in the cavity 106 where it remains during the casting process. The cope 102 is then closed on top of the drag 104 with the cope 102 and drag 104 cooperatively defining a cavity 106 surrounding at least portions of the core 100 in the shape of the valve seat flange 14. Molten material, such as ductile iron, is then poured into the cavity 106 through runner gate system. The molten material flows down into the cavity 106 where it is permitted to cure. After curing, the completed part is removed from the cope 102 and drag 104. The core 100 is broken apart and removed from within the part leaving behind the rough liner 20 entrapped within the valve seat flange 14. The rough valve seat flange 14 is shown in FIGS. 9 and 10. As shown, the liner 20 continues to include lugs 62-a–d. In addition, the interfacing surfaces of the valve seat flange 14 remain rough. The valve seat flange 14 is then finished as desired, for example, by machining to remove the runner gate system and any undesired rough surfaces. In this embodiment, the finishing process includes the step of forming internal threads 38 in the standpipe neck 34 to threadedly receive the lower end of the lower standpipe 16. Also, the bottom surface of the base flange 36 is machined to provide a smooth interface with the top flange of the hydrant shoe 18. Similarly, the interior surface of the second reduced diameter portion 44 is machined to provide a smooth interface with the valve seat 46 and valve seat o-rings. The annular drain recess 57 and drain holes 58a–b are also preferably, but not necessarily, machined into the valve seat flange 14 after the casting process is complete. Further, in this embodiment, the inner circumferential surface of the liner 20 is machined to form threads 42. The threads 42 may, however, be formed before or after the valve seat flange 14 casting process.

The valve seat flange 14 is installed in the hydrant 10 by aligning flange 14 and shoe 18 so that the rim 52 is fitted within the shoe 18. The valve seat flange 14 is then secured to hydrant shoe 18, for example, by bolts or other fasteners (not shown) extending through the bolt holes 51 in the base flange 36 and the corresponding top flange of the hydrant shoe 18. The valve assembly 22 may then be installed within the valve seat flange 14. The valve seat 46 is threaded into the liner 20 creating a brass-on-brass threaded interface. The valve seat 46 is threaded into the liner 20 until the bottom end of the valve seat 46 abuts the upper surface of the second reduced diameter portion 44. This helps to ensure proper positioning of the valve assembly 22 within the valve seat flange 14. The lower standpipe 16 is then installed on the valve seat flange 14. The threaded lower end of the standpipe 16 is threaded into the standpipe neck 34. The lower standpipe 16 is threaded into the valve seat flange 14 until the bottom end of the lower standpipe abuts the top surface of the first reduced diameter portion 40. In that way, the first reduced diameter portion 40 helps to ensure proper positioning of the lower standpipe 16. The remaining portions of the hydrant 10 are assembled in a conventional manner.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. A fire hydrant comprising:
   a bonnet;
   a standpipe connected to said bonnet;
   a valve seat flange directly connected to said standpipe, said valve seat flange including a liner integral with said valve seat flange, said liner entrapped within an interior of said valve seat flange, said liner having an inner circumferential surface, said inner circumferential surface defining internal threads;
   a valve assembly mounted within said valve seat flange, said valve assembly including a valve seat, said valve seat including external threads engaged with said internal threads of said liner; and
   a hydrant shoe directly connected to said valve seat flange.

2. The hydrant of claim 1 wherein said liner is manufactured from one of brass and bronze.

3. The hydrant of claim 1 wherein said liner includes an outer peripheral portion, said outer peripheral portion being fully entrapped by said valve seat flange.

4. The hydrant of claim 1 wherein said valve seat flange includes a standpipe neck, said standpipe neck being internally threaded; and
   said standpipe include an externally threaded lower end, said lower end being threadedly fitted into said standpipe neck.

5. The hydrant of claim 4 wherein said valve seat flange includes a generally planar bottom flange; and
   said hydrant shoe include a generally planar top flange, said bottom flange of said valve seat flange mating with said top flange of said hydrant shoe.

6. The hydrant of claim 5 wherein said liner includes an outer peripheral portion, said outer peripheral portion defining at least one of a protrusion and a recess, said protrusion being said entrapped by said valve seat flange to reduce the likelihood of said liner rotating with respect to said valve seat flange.

7. A valve seat flange for a fire hydrant comprising:
   a body defining an internal flow path and having a first end and a second end;
   a neck disposed at said first end of said body, said neck having an internal diameter and being configured to mount directly to a standpipe;
   a base flange disposed at said second end of said body, said base flange configured to mount directly to a hydrant shoe;
   a liner integral with said body, said liner having an outer peripheral portion entrapped within said body, said liner having an internal circumferential surface defining internal threads.

8. The valve seat flange of claim 7 wherein said body include a first reduced diameter portion having an internal diameter smaller than said internal diameter of said neck, said liner being disposed within said first reduced diameter portion.

9. The valve seat flange of claim 8 wherein said neck defines internal threads.

10. The valve seat flange of claim 9 wherein said first reduced diameter defines a standpipe stop for abutting engagement with a standpipe.

11. The valve seat flange of claim 10 wherein said body includes a second reduced diameter portion having an internal diameter smaller than said internal diameter of said first reduced diameter portion, said second reduced diameter portion defining a surface to receive a valve seat.

* * * * *